(12) United States Patent
Urasawa

(10) Patent No.: US 6,608,702 B1
(45) Date of Patent: Aug. 19, 2003

(54) METHOD FOR GENERATING THRESHOLD PATTERNS AND GRADATION IMAGE BINARIZING DEVICE

(75) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/352,550

(22) Filed: Jul. 12, 1999

(30) Foreign Application Priority Data

Jul. 13, 1998 (JP) .......................................... 10-196836

(51) Int. Cl.[7] .......................... H04N 1/405; H04N 1/52
(52) U.S. Cl. ........................................ 358/3.2; 358/536
(58) Field of Search ........................ 358/3.2, 536, 535, 358/532, 3.13, 1.9

(56) References Cited

U.S. PATENT DOCUMENTS 4,819,193 A * 4/1989 Imao ........................... 358/521
5,418,627 A * 5/1995 Sato et al. .................. 358/3.2

FOREIGN PATENT DOCUMENTS

JP 10-173923 6/1998

\* cited by examiner

*Primary Examiner*—Scott Rogers
(74) *Attorney, Agent, or Firm*—Rabin & Berdo, P.C.

(57) ABSTRACT

There is disclosed a method wherein an origin is set on the dither pattern and the dither pattern is rotated relative to the origin by a required screen angle. By rotating the dither pattern, real-number coordinates of an origin of adjacent dither patterns are obtained. Coordinates of the origin of the adjacent dither pattern are corrected by rounding fractions of the real-coordinate so that the real-number coordinates are changed to integer coordinates. An angle which a segment connecting an origin of the dither pattern to be based on and that of the adjacent dither pattern obtained after the correction forms with a horizontal line is selected as a screen angle. By this, the shape of the dither pattern obtained after being rotated becomes uniform, preventing the occurrence of moire.

5 Claims, 14 Drawing Sheets

| 1 | 2 | 7 | 8 | 5 | 6 | 11 | 12 | 9 | 10 | 15 | 16 | 13 | 14 | 3 | 3 |
|---|---|---|---|---|---|---|---|---|---|---|---|---|---|---|---|
| 5 | 6 | 7 | 12 | 9 | 10 | 15 | 16 | 16 | 13 | 2 | 3 | 4 | 1 | 6 | 7 |
| 12 | 9 | 10 | 15 | 16 | 13 | 14 | 3 | 4 | 1 | 6 | 7 | 8 | 5 | 10 | 11 |
| 16 | 13 | 14 | 3 | 4 | 1 | 2 | 7 | 8 | 5 | 6 | 11 | 12 | 9 | 14 | 15 |
| 4 | 1 | 2 | 7 | 8 | 5 | 6 | 11 | 12 | 9 | 10 | 15 | 16 | 13 | 13 | 2 |
| 8 | 5 | 6 | 11 | 12 | 9 | 10 | 14 | 15 | 16 | 13 | 2 | 3 | 4 | 1 | 6 |
| 11 | 12 | 9 | 14 | 15 | 16 | 13 | 2 | 3 | 4 | 1 | 6 | 7 | 8 | 5 | 10 |
| 15 | 16 | 13 | 2 | 3 | 4 | 1 | 6 | 7 | 8 | 5 | 10 | 11 | 12 | 9 | 14 |
| 3 | 4 | 1 | 6 | 7 | 8 | 5 | 10 | 11 | 12 | 9 | 14 | 15 | 15 | 16 | 1 |
| 7 | 8 | 5 | 6 | 11 | 12 | 12 | 13 | 14 | 15 | 16 | 1 | 2 | 3 | 4 | 5 |
| 10 | 11 | 12 | 9 | 14 | 15 | 16 | 13 | 2 | 3 | 4 | 5 | 6 | 7 | 8 | 9 |
| 14 | 15 | 16 | 13 | 2 | 3 | 4 | 1 | 6 | 7 | 8 | 5 | 10 | 11 | 12 | 13 |
| 2 | 3 | 4 | 1 | 6 | 7 | 8 | 5 | 10 | 11 | 12 | 9 | 13 | 14 | 15 | 16 |
| 6 | 7 | 8 | 5 | 9 | 10 | 11 | 12 | 13 | 14 | 15 | 16 | 1 | 2 | 3 | 4 |
| 9 | 10 | 11 | 12 | 13 | 14 | 15 | 16 | 1 | 2 | 3 | 4 | 5 | 6 | 7 | 8 |
| 9 | 14 | 15 | 16 | 1 | 2 | 3 | 4 | 5 | 6 | 7 | 8 | 9 | 10 | 11 | 12 |

FIG. 8

$$\begin{pmatrix} X0 \\ Y0 \end{pmatrix} = \begin{pmatrix} \cos\theta & -\sin\theta \\ \sin\theta & \cos\theta \end{pmatrix} \begin{pmatrix} SIZE \\ 0 \end{pmatrix} \quad \text{----(1)}$$

$$\begin{pmatrix} X0 \\ Y0 \end{pmatrix} = \begin{pmatrix} \cos 14 & -\sin 14 \\ \sin 14 & \cos 14 \end{pmatrix} \begin{pmatrix} 4 \\ 0 \end{pmatrix}$$

$$= \begin{pmatrix} 0.9703 & -0.2419 \\ 0.2419 & 0.9703 \end{pmatrix} \begin{pmatrix} 4 \\ 0 \end{pmatrix}$$

$$= \begin{pmatrix} 3.8812 \\ 0.9677 \end{pmatrix} \quad \text{----(2)}$$

$$(X, Y) = (4, 1) \quad \text{----(3)}$$

$$\theta' = \operatorname{atan}(Y/X) \quad \text{----(4)}$$

$$\theta' = \operatorname{atan}(1/4) = 14.0362 \quad \text{----(5)}$$

$$MUL = SIZE / \sqrt{(X^2 + Y^2)} \quad \text{----(6)}$$

$$MUL = 4/\operatorname{sqrt}(4^2 + 1^2) = 0.9701 \quad \text{----(7)}$$

FIG. 9

$$\begin{pmatrix} X \\ Y \end{pmatrix} = \begin{pmatrix} A & B \\ C & D \end{pmatrix} \begin{pmatrix} X' \\ Y' \end{pmatrix} + \begin{pmatrix} E \\ F \end{pmatrix} \quad \cdots\text{(8)}$$

$$\begin{pmatrix} A & B \\ C & D \end{pmatrix} = \begin{pmatrix} MUL*\cos\theta' & -MUL*\sin\theta' \\ MUL*\sin\theta' & -MUL*\cos\theta' \end{pmatrix} \quad \cdots\text{(9)}$$

$$\begin{pmatrix} E \\ F \end{pmatrix} = \begin{pmatrix} 0 \\ 0 \end{pmatrix} \quad \cdots\text{(10)}$$

$$\begin{pmatrix} A & B \\ C & D \end{pmatrix} = \begin{pmatrix} 0.9412 & -0.2353 \\ 0.2353 & 0.9412 \end{pmatrix} \quad \cdots\text{(11)}$$

| 1 | 6 | 7 | 8 | 5 | 10 | 11 | 12 | 9 | 14 | 15 | 16 | 13 | 2 | 3 | 4 |
|---|---|---|---|---|---|---|---|---|---|---|---|---|---|---|---|
| 5 | 10 | 11 | 12 | 9 | 14 | 15 | 16 | 13 | 2 | 3 | 4 | 1 | 1 | 6 | 7 |
| 9 | 14 | 15 | 16 | 13 | 2 | 3 | 4 | 1 | 1 | 6 | 7 | 8 | 5 | 10 | 11 |
| 13 | 2 | 3 | 4 | 1 | 1 | 6 | 7 | 8 | 5 | 10 | 11 | 12 | 9 | 14 | 15 |
| 1 | 1 | 6 | 7 | 8 | 5 | 10 | 11 | 12 | 9 | 14 | 15 | 16 | 13 | 2 | 3 |
| 8 | 5 | 10 | 11 | 12 | 9 | 14 | 15 | 16 | 13 | 2 | 3 | 4 | 1 | 1 | 6 |
| 12 | 9 | 14 | 15 | 16 | 13 | 2 | 3 | 4 | 1 | 1 | 6 | 7 | 8 | 5 | 10 |
| 16 | 13 | 2 | 3 | 4 | 1 | 1 | 6 | 7 | 8 | 5 | 10 | 11 | 12 | 9 | 14 |
| 4 | 1 | 1 | 6 | 7 | 8 | 5 | 10 | 11 | 12 | 9 | 14 | 15 | 16 | 13 | 2 |
| 7 | 8 | 5 | 10 | 11 | 12 | 9 | 14 | 15 | 16 | 13 | 2 | 3 | 4 | 1 | 1 |
| 11 | 12 | 9 | 14 | 15 | 16 | 13 | 2 | 3 | 4 | 1 | 1 | 6 | 7 | 8 | 5 |
| 15 | 16 | 13 | 2 | 3 | 4 | 1 | 1 | 6 | 7 | 8 | 5 | 10 | 11 | 12 | 9 |
| 3 | 4 | 1 | 1 | 6 | 7 | 8 | 5 | 10 | 11 | 12 | 9 | 14 | 15 | 16 | 13 |
| 6 | 7 | 8 | 5 | 10 | 11 | 12 | 9 | 14 | 15 | 16 | 13 | 2 | 3 | 4 | 1 |
| 10 | 11 | 12 | 9 | 14 | 15 | 16 | 13 | 2 | 3 | 4 | 1 | 1 | 6 | 7 | 8 |
| 14 | 15 | 16 | 13 | 2 | 3 | 4 | 1 | 1 | 6 | 7 | 8 | 5 | 10 | 11 | 12 |

FIG. 13

$$\begin{pmatrix} A & B \\ C & D \end{pmatrix} = \begin{pmatrix} 0.9412 & -0.2353 \\ 0.2353 & 0.9412 \end{pmatrix} \quad \text{-----(1)}$$

$$\begin{pmatrix} E \\ F \end{pmatrix} = \begin{pmatrix} 0 \\ 0 \end{pmatrix} \quad \text{-----(2)}$$

$$\begin{pmatrix} X' \\ Y' \end{pmatrix} = \begin{pmatrix} 0.9412 & -0.2353 \\ 0.2353 & 0.9412 \end{pmatrix} \begin{pmatrix} 10 \\ 12 \end{pmatrix} \quad \text{-----(3)}$$

$$= \begin{pmatrix} 6.5884 \\ 13.6474 \end{pmatrix} \rightarrow \begin{pmatrix} 7 \\ 14 \end{pmatrix} \quad \text{-----(4)}$$

$$\begin{aligned} 7 \ \% \ 4 &= 3 \\ 14 \ \% \ 4 &= 2 \end{aligned} \quad \text{-----(5)}$$

BASIC PATTERN

|   | 0 | 1 | 2 | 3 |
|---|---|---|---|---|
| 0 | 1 | 2 | 3 | 4 |
| 1 | 5 | 6 | 7 | 8 |
| 2 | 9 | 10 | 11 | 12 |
| 3 | 13 | 14 | 15 | 16 |

FIG. 14(a)

PATTERNS OBTAINED AFTER BEING ROTATED

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| 0  | 1 | 6 | 7 | 8 | 5 | 10| 11| 12| 9 | 14| 15 | 16 | 13 | 2  | 3  | 4  |
| 1  | 5 | 10| 11| 12| 9 | 14| 15| 16| 13| 2 | 3  | 4  | 1  | 1  | 6  | 7  |
| 2  | 9 | 14| 15| 16| 13| 2 | 3 | 4 | 1 | 1 | 6  | 7  | 8  | 5  | 10 | 11 |
| 3  | 13| 2 | 3 | 4 | 1 | 1 | 6 | 7 | 8 | 5 | 10 | 11 | 12 | 9  | 14 | 15 |
| 4  | 1 | 1 | 6 | 7 | 8 | 5 | 10| 11| 12| 9 | 14 | 15 | 16 | 13 | 2  | 3  |
| 5  | 8 | 5 | 10| 11| 12| 9 | 14| 15| 16| 13| 2  | 3  | 4  | 1  | 1  | 6  |
| 6  | 12| 9 | 14| 15| 16| 13| 2 | 3 | 4 | 1 | 1  | 6  | 7  | 8  | 5  | 10 |
| 7  | 16| 13| 2 | 3 | 4 | 1 | 1 | 6 | 7 | 8 | 5  | 10 | 11 | 12 | 9  | 14 |
| 8  | 4 | 1 | 1 | 6 | 7 | 8 | 5 | 10| 11| 12| 9  | 14 | 15 | 16 | 13 | 2  |
| 9  | 7 | 8 | 5 | 10| 11| 12| 9 | 14| 15| 16| 13 | 2  | 3  | 4  | 1  | 1  |
| 10 | 11| 12| 9 | 14| 15| 16| 13| 2 | 3 | 4 | 1  | 1  | 6  | 7  | 8  | 5  |
| 11 | 15| 16| 13| 2 | 3 | 4 | 1 | 1 | 6 | 7 | 8  | 5  | 10 | 11 | 12 | 9  |
| 12 | 3 | 4 | 1 | 1 | 6 | 7 | 8 | 5 | 10| 11| 12 | 9  | 14 | 15 | 16 | 13 |
| 13 | 6 | 7 | 8 | 5 | 10| 11| 12| 9 | 14| 15| 16 | 13 | 2  | 3  | 4  | 1  |
| 14 | 10| 11| 12| 9 | 14| 15| 16| 13| 2 | 3 | 4  | 1  | 1  | 6  | 7  | 8  |
| 15 | 14| 15| 16| 13| 2 | 3 | 4 | 1 | 1 | 6 | 7  | 8  | 5  | 10 | 11 | 12 |

FIG. 14(b)

METHOD FOR GENERATING THRESHOLD PATTERNS AND GRADATION IMAGE BINARIZING DEVICE

BACKGROUND OF THE INVENTION

1. Field of the Invention

The present invention relates to a method for generating a threshold pattern and a gradation image binarizing device used for binarizing processing of color images.

2. Description of the Related Art

A photograph image of a newspaper is printed using aggregate of many dots. Such an image is called a "dot image". To print an image having gradation like a photograph by using a binary output medium such as a dot printer, image data obtained in advance by picture-taking must be converted to a dot image. A color of dot, screen angle and a number of lines are used as parameters indicating the property of the dot image. FIG. 2 is an explanatory diagram showing a screen angle of a dot image, FIG.2 (a) showing a relation between the screen angle and the number of lines and FIG. 2 (b) showing a typical arrangement of the screen angle.

As shown in the drawing, dots 1 indicated by black round points are so placed as to be aligned at an equal interval in the direction of the arrow. The arrow 2 is referred to as a line. The screen angle is an angle which the line forms with a horizontal line (a line parallel to prime scanning line). In the example shown in the drawing, the dot image is so configured that the screen angle is 45 degrees. The number of lines is one per a inch counted when a lot of lines drawn at an equal interval and in parallel are traced in the vertical direction. In the case of a black-and-white image, if the screen angle is set to 45 degrees, the dot image can be produced which is relatively hard to distinguish when seen by the naked eye.

For color printing, dots each having one of 3 or 4 color components (cyan, magenta, yellow and black) are combined to produce a color. If dots having a different color and/or shape are arranged regularly, streaking called "moire" shows. For the purpose of reducing such moire and making the dot inconspicuous, the use of the screen angle being different for every color component is widely known.

FIG. 2 (b) shows a screen angle suitable for every color component which is applicable to printing of a color image. The screen angle for a black color being most perceivable by the naked eye is set to 45 degrees. Further, the screen angle for a yellow color being most inconspicuous and light is set to 0 (zero).

On the other hand, the screen angle for a magenta or cyan color is set to an intermediate angle, for example, 75 and 15 degrees respectively. Each color component is perceived in a different way when seen by the naked eye, and the most suitable screen angle must be selected accordingly.

However, the conventional technologies as described above have the following problems to be solved.

The Dither method and/or Dot pattern method are used for printing a gradation image composed of the dot as described above. The principles of these methods are described below.

Each value of a picture element (i.e., density of a picture element) is represented by, for example, 16 step multivalued data. A gradation of one picture element is represented by a cluster of 4×4 dots. For example, if the value of a picture element is "0" (zero), all 4×4 dots become a white color; and if it is "6", out of the 4×4 dots, 6 dots become a black color and the remaining dots being a white color. The larger the value of a picture element becomes, the more the black dots increase in number. By selecting the proper position of black dots, the quality of an image obtained when a cluster of dots are seen by the naked eye at a short distance is improved In order to automatically select either of a black or a white color, the Dither pattern method uses a matrix in which, for example, 4×4 threshold values are assigned therein. For example, if a value of a picture element of an input gradation image is "6", this value of the picture element is compared with each of 4×4 threshold values. When the value of the picture element exceeds a threshold value, the dot existing at the position is made a black color. If the value of the picture element is less than the threshold value, the dot existing at the position is made a white color. Such binarizing processing allows the selection of either of a black or white color of each dot.

Generally, a dither pattern is represented by a square where a threshold value is assigned at a pitch of dots. In order to align binarized dots in the direction of a screen angle, the rotation of an edge of the dither pattern by an angle of the screen angle is required.

FIG. 3 is an explanatory diagram illustrating a method for rotating a dither pattern. FIG. 3 (a) shows an example of a rotation matrix adapted to be rotated by operational processing of the dither pattern. FIG. 3 (b) shows a result obtained from the rotation of the dither pattern.

As depicted in FIG. 3 (a), for example, a point at a position (X, Y) on the XY coordinates is rotated relative to an origin at an angle of θ in a counterclockwise direction. At this point, the position on the coordinates obtained after being rotated is (X', Y'). A rotation matrix used to obtain the position (X', Y') of the coordinates obtained after being rotated from the position (X, Y) existing before being rotated is shown in the drawing. In the right side of the formula, a coefficient of the position (X, Y) corresponds to the rotation matrix.

By expanding this formula, the following equations are gotten.

$$X' = \cos\theta X \sin\theta Y$$

$$Y' = \sin\theta X \cos\theta Y$$

Thus, by performing operational processing of a determinant, the conversion from original coordinates (X, Y) to coordinates (X', Y') obtained after being rotated is made possible.

An input pattern shown on the left side in FIG. 3 (b) is the dither pattern composed of 4×4 threshold values. The numbers 1 to 16 are assigned sequentially, from the upper left, to each threshold value of this input pattern. The 4×4 dots are binarized then.

For example, the input pattern is rotated relative to a position indicated as "1" at the upper left corner in a counterclockwise direction by an angle of 0 . In this case, the coordinates of the site having the 4×4 threshold values are obtained and converted using the rotation matrix. The results are shown on the right side of the drawing.

Moreover, fractions of the coordinate values obtained by the operational processing are processed by its omission or by counting fractions as one. The site where the dot is arranged is limited to a certain position specified by a structure of a dot image. Each threshold value is always assigned to any of the dots and is used for binarizing processing of the dot. In an area in which a hatching is assigned, a site not corresponding to an input pattern appears. This is because an interval distance between dots remains unchanged even though each side of the dither pattern is made longer due to the rotation of the dither pattern. If nothing is done here, a hole occurs in the dither pattern. To prevent this, the following processing is carried out.

A re-sampling method is introduced by which, in views of convenience of the operational processing, an inverse operation of the coordinates of a site where all threshold values obtained after the rotation are to be assigned is performed and, by using this result, the corresponding threshold value is selected from that of the dither pattern existing before the rotation.

FIG. 4 is an explanatory diagram showing re-sampling processing of the dither pattern, FIG. 4 (a) illustrating the re-sampling and FIG. 4 (b) showing a coordinate system of the dither pattern.

As a first step, coordinates of a site are obtained where all the threshold values of the dither pattern obtained after being rotated are assigned therein. Using the coordinates at 20 positions as shown on the right side in FIG. 4 (a), an inverse operation is performed of the coordinates of a site where a threshold value of the dither pattern existing before being rotated shown on the left side in FIG. 4 (a) is assigned. When fractions of the coordinates obtained by the inverse operation are processed by rounding, the coordinates indicate a site of any threshold included in the dither pattern shown in the left. The resulting threshold value is applied to that contained in the pattern obtained after being rotated. By this method, a dither pattern being free from a hole can be obtained. The processing is called "re-sampling processing".

Furthermore, the dither pattern is displayed as shown in FIG. 4 (b) and a point in its upper left is designated as an origin. An X axis is set in the horizontal direction toward the right and Y axis in the vertical direction downward. In the calculation of the rotation shown in FIG. 3 (a), a rotation angle θ is set in a counterclockwise direction. On the other hand, in the coordinate system as depicted in FIG. 4 (b), the rotation angle θ is set in a clockwise direction by an arrow 3 in the drawing.

FIG. 5 shows an image and dither pattern binarized according to the conventional method. FIG. 5 (a) is a binarized image obtained by the rotation processing. FIG. 5 (b) is an example of rotation of the dither pattern.

In the example, by using such a conventional re-sampling method, a dither pattern of 4×4 configurations is rotated by 14 degrees in a counterclockwise direction. Each dither pattern is enclosed by a polygonal line. In this state, when a uniform gray image with a density of 25% is binarized, results as shown in FIG. 5 (a) appears.

As depicted in FIG. 5 (b), a shape of the dither pattern obtained after being rotated varies depending on a site and, when compared with that existing before being rotated, the overlapping or shortage in the threshold has occurred. That is, when compared with the dither pattern shown on the left side in FIG. 4 (a), the conventional dither pattern cannot represent faithfully the density of an original image due to a difference in allocated thresholds. For this reason, as seen in FIG. 5 (a), it is impossible to obtain a uniform gray image expected originally and a certain amount of streaking called moire caused by the disturbance in a pattern appears.

SUMMARY OF THE INVENTION

In view of the above, it is an object of the present invention to provide a method for generating a threshold pattern which can prevent the occurrence of moire by rotating the same.

Another object of the present invention is to provide a method for generating a threshold pattern which can prevent the moire that may occur at the time of the conversion from an image having a uniform and intermediate density to a dot image.

A further object of the present invention is to provide a gradation image binarizing device which can perform binarizing processing by setting a free screen angle for each color component used to represent a color image, thus implementing a dot image of high quality. These objects are achieved by the following methods and a device:

1. A method for converting a gradation image each value of a picture element of which is represented by multi-values to a dot image having a specified screen angle and for generating a threshold pattern wherein a threshold value is assigned at a pitch of an array of said dot to binarize each value of said picture element comprising steps of:

setting an origin on a threshold pattern to be based on and obtaining real-number coordinates of an origin of an adjacent threshold pattern by rotating the threshold pattern relative to the above origin by a required screen angle; correcting coordinates of the origin of the adjacent threshold pattern so that the real-number coordinates are changed to integer coordinates by rounding fractions of the real-number coordinates; and selecting, as a screen angle, an angle which a segment connecting an origin of the dither pattern to be based on and that of the adjacent dither pattern obtained after the correction forms with a horizontal line.

2. The method for rotating the threshold pattern wherein all threshold patterns obtained after being rotated used to cover all dot images to be outputted are adapted to have the same shape and wherein all values of each threshold assigned at a site corresponding to each threshold pattern are the same.

3. The method for rotating the threshold pattern wherein coordinates (X, Y) of the threshold pattern existing before being rotated are obtained by an operational processing of coordinates (X', Y') of each threshold value of the threshold pattern obtained after being rotated, a threshold value assigned at coordinates (X,Y) of the threshold pattern before being rotated is selected and the selected threshold value is used as a threshold value of the threshold pattern obtained after being rotated.

4. The method for rotating the threshold pattern wherein, in the operational processing, affine transformation is performed using a magnification MUL of an edge of the threshold pattern and a corrected screen angle θ' as factors.

5. A gradation image binarizing device comprising:
    a threshold pattern storing section used to store a threshold pattern for binarization;
    a gradation image storing section used to store a gradation image to be binarized by the threshold pattern;
   a parameter storing section used to store a rotation parameter obtained from a screen angle after correction carried out in a manner that an origin is set on the pattern and real-number coordinates of an origin of an adjacent threshold pattern are obtained by rotating the threshold pattern relative to the origin by a required screen angle and that coordinates of the origin of the adjacent threshold pattern are corrected so that the real-number coordinates are changed to integer coordinates by rounding fractions of the real-number coordinates and an angle which a segment connecting an origin of the dither pattern to be based on and that of the adjacent dither pattern obtained after the correction forms with a horizontal line are selected as a screen angle; and a means for taking out a threshold value of the threshold pattern corresponding to coordinates obtained by conversion processing of coordinates of each picture element of the gradation image by using a rotation parameter stored in the parameter storing section and for binarizing the gradation image.

BRIEF DESCRIPTION OF THE DRAWING

The above and other objects, advantages and features of the present invention will be more apparent from the following description taken in conjunction with the accompanying drawings in which:

FIG. 8 is an explanatory diagram showing operational processing procedures from Step S11 to Step S14 shown in FIG. 1.

FIG. 9 is an explanatory diagram showing operational processing procedures of Step 15 using affine transformation shown in FIG. 1;

FIG. 13 is an explanatory diagram showing an operational processing procedures for the dither pattern rotating device shown in FIG. 11; and FIG. 14 shows a dither pattern obtained before being rotated and after being rotated, FIG. 14 (a) showing a basic dither pattern existing before being rotated and FIG. 14 (b) is a diagram showing an array of dither patterns obtained after being rotated.

DETAILED DESCRIPTION OF THE PREFERRED EMBODIMENTS

Best modes of carrying out the present invention will be described in further detail using various embodiments with reference to the accompanying drawings.

First Embodiment

Figures 5A, 5B:
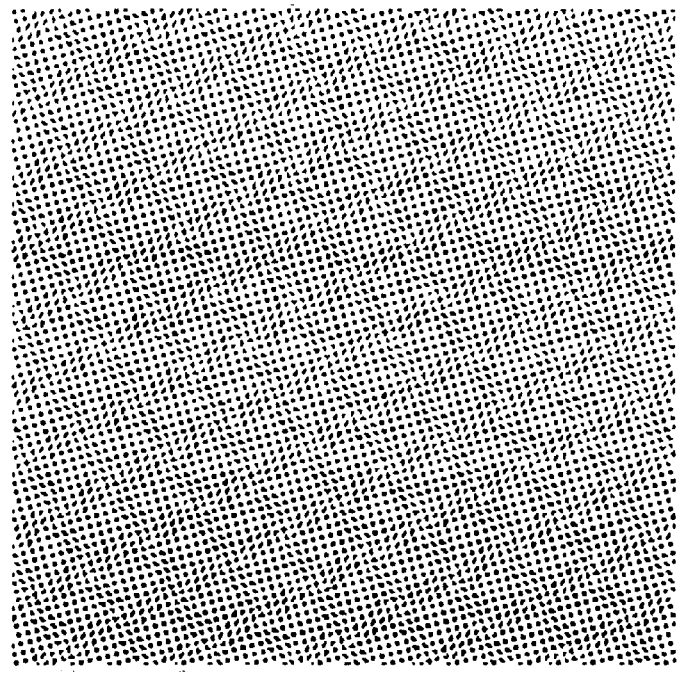
FIG. 5 illustrates an image and dither pattern obtained by conventional binarizing processing, FIG. 5 (a) being a binarized image obtained by rotation processing, FIG. 5 (b) being an example of a dither pattern.
Figure 6A:
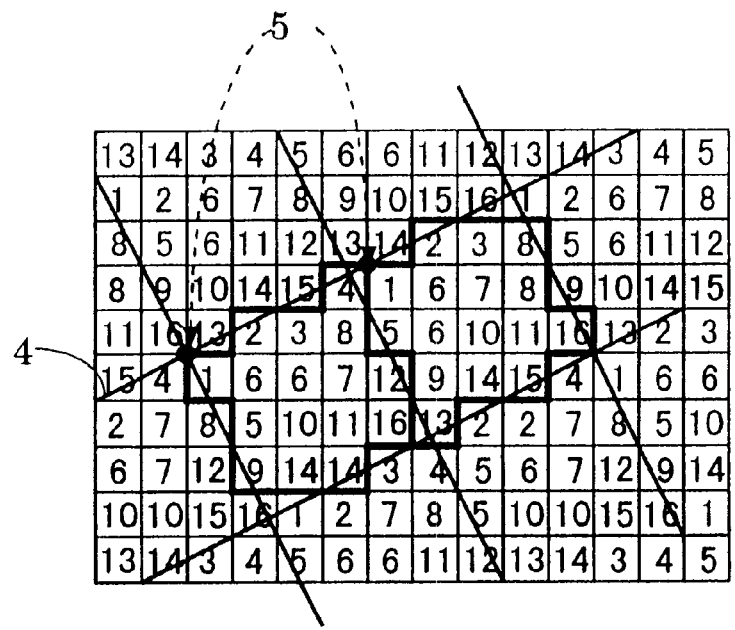
FIG. 6 is an explanatory diagram of the principle of a method of the present invention, FIG. 6 (a) showing a case where an origin of each dither pattern does not lie at a point on a line indicating a screen angle and FIG. 6 (b) showing a case where an origin of each dither pattern lies at a point of a line.
Figure 6B:
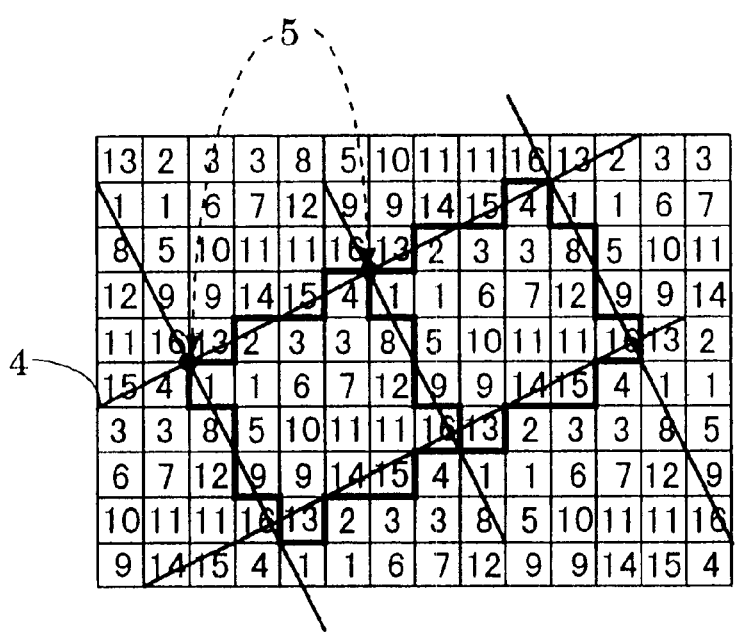

FIG. 6 is an explanatory diagram of the principle of a method of the present invention, FIG. 6 (a) showing a case where an origin 5 of each dither pattern does not lie at a point on a line 4 indicating a screen angle and FIG. 6 (b) showing a case where an origin 5 of each dither pattern lies at a point of a line 4 indicating a screen angle. Referring to FIG. 6 (a), a center of rotation, i.e., the origin 5 in the left dither pattern out of the two dither patterns enclosed by a bold line is located on the top at the left upper corner of a part having the number 1. However, if the screen angle is set to 14 degrees, the line 4 does not pass through the top at the left upper corner of the part having the number 1 in the left dither pattern. Accordingly, even if re-sampling processing of the two dither patterns is performed by using a method shown in FIG. 4, each threshold value assigned at a corresponding position is not the same. As shown in FIG. 5, it is impossible to suit the shape of the right dither pattern to that of the left one.

Unlike in the case of the conventional method, according to the present invention, as shown in FIG. 6 (b), a screen angle required is so corrected that the line 4 always passes through all corresponding points of the dither patterns after each of them is rotated. The origin 5 of each dither pattern always passes through the top at the left upper corner of the part having the number 1. By performing re-sampling processing after having made the correction of the screen angle, all dither patterns are able to have the same shape and all thresholds of corresponding positions are able to be in accord, thus allowing binarizing processing to implement an image of high quality.

Figure 7A:
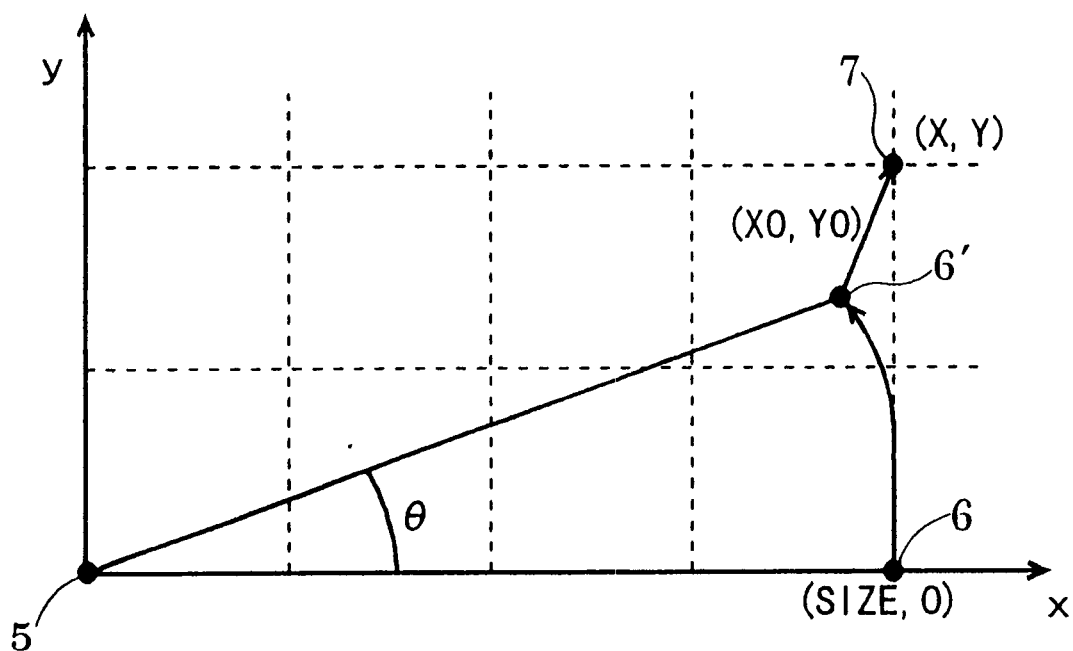
FIG. 7 is an explanatory diagram showing a concrete processing of a method of the present invention.
Figure 7B:
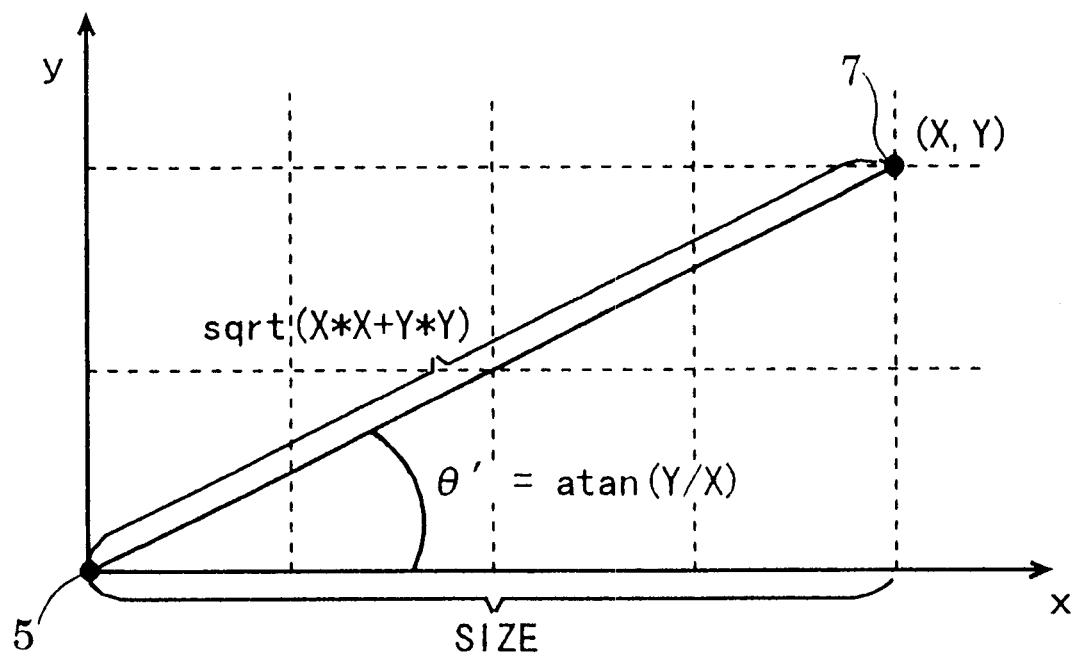

FIG. 7 is an explanatory diagram showing concrete processing of a method of the present invention.

Referring to FIG. 7 (a), if the right and left top points of the upper edge of the dither pattern before being rotated are assumed to be positioned at a point 5 and a point 6, the coordinates of the point 5 are (0, 0) and those of the point 6 are (SIZE, 0). The "SIZE" is equivalent to a length of a upper edge of the dither pattern before being rotated. As shown in the drawing, an X axis is set in the right direction and a Y axis in the upward direction. In the upper right quadrant, the dither pattern is rotated relative to the origin 5 in a counterclockwise direction by an angle of a screen angle θ. When the dither pattern is rotated by the angle θ, the point 6 moves to a point 6'. At this point, the point 6' (X0, Y0) is not positioned on any point on a grid shown by broken lines. The point on the grid is a site where its coordinate valuea are integer values and where a dot can exist.

Then, any fraction in the decimal place at the coordinates (X0, Y0) is counted as one and the point 6' is moved to a point 7 with the coordinates (X, Y). FIG. 7 (b) shows a positional relation after being moved. Thus, the screen angle θ that has been required is changed, by correction, to the screen angle θ'. When the screen angle θ is corrected, a scale component of the dither pattern is so corrected at the same time. The size of a upper edge of all the dither patterns becomes equal.

The origin of another dither pattern adjacent to the dither pattern to be based on having a line from the points 5 to 7 as seen in FIG. 7 (*b*), as a upper edge, lies exactly on the point 7. The same processing as shown in FIG. 7 can be carried out on the neighboring other dither patterns. Accordingly, the shape of all dither patterns obtained after being rotated, which covers all the dot image to be outputted, becomes the same and all values of each threshold value assigned at corresponding positions becomes conformable.

Figure 1:
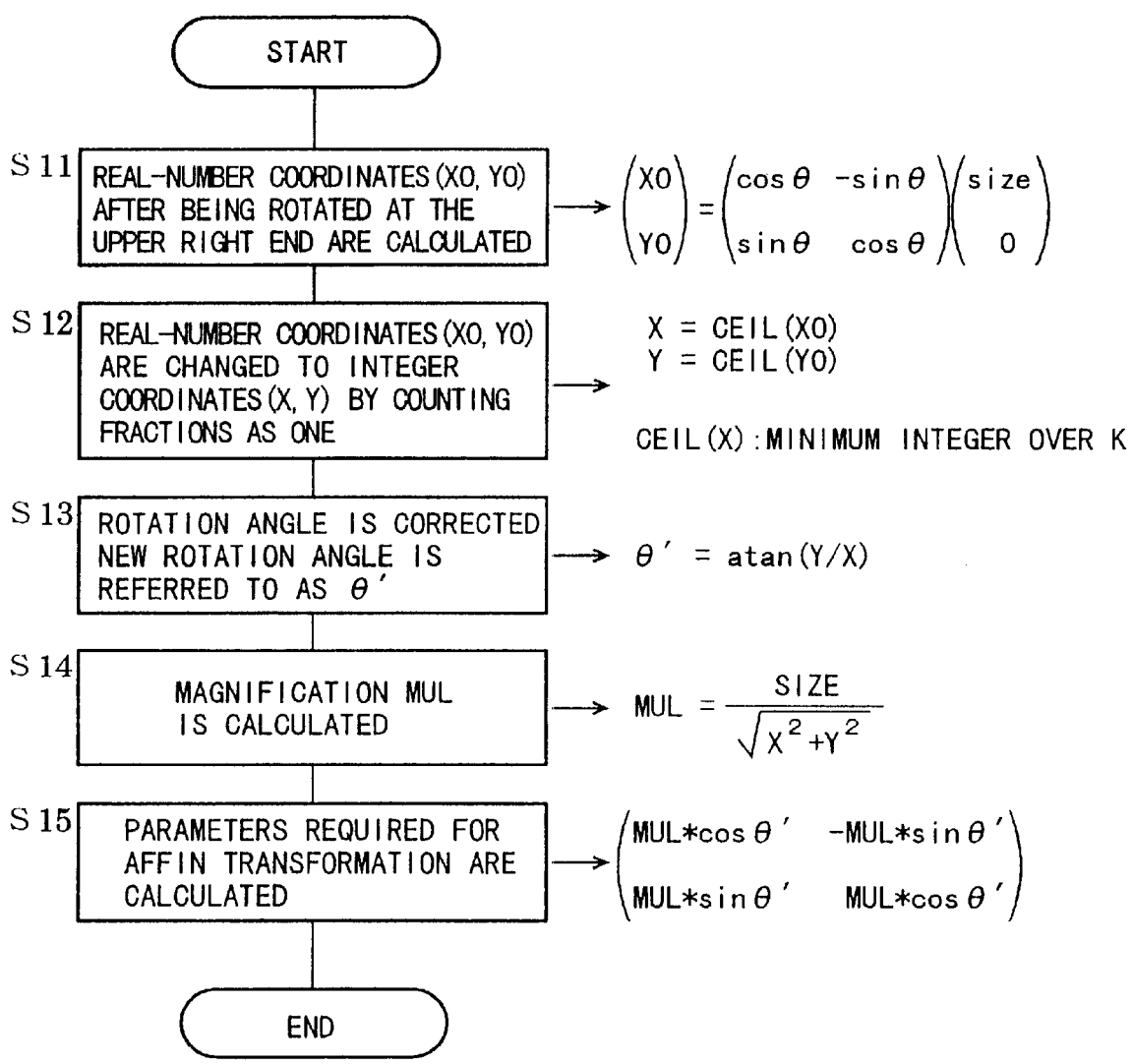
FIG. 1 is a flowchart illustrating a method of rotating a dither pattern of the present invention.
Figure 2A:
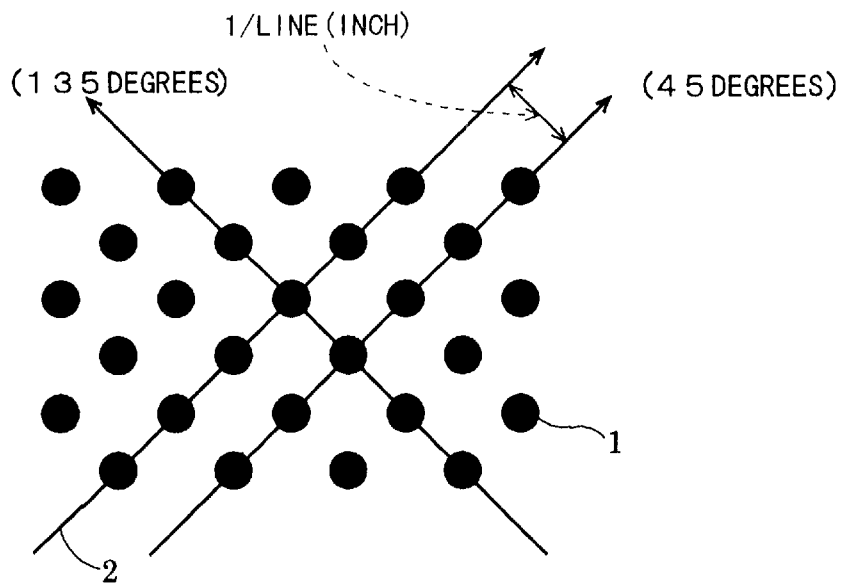
FIG. 2 is an explanatory diagram showing a screen angle of a general dot image, FIG. 2 (a) showing a relation between the screen angle and the number of lines and FIG. 2 (b) showing an arrangement of a typical screen angle.
Figure 2B:
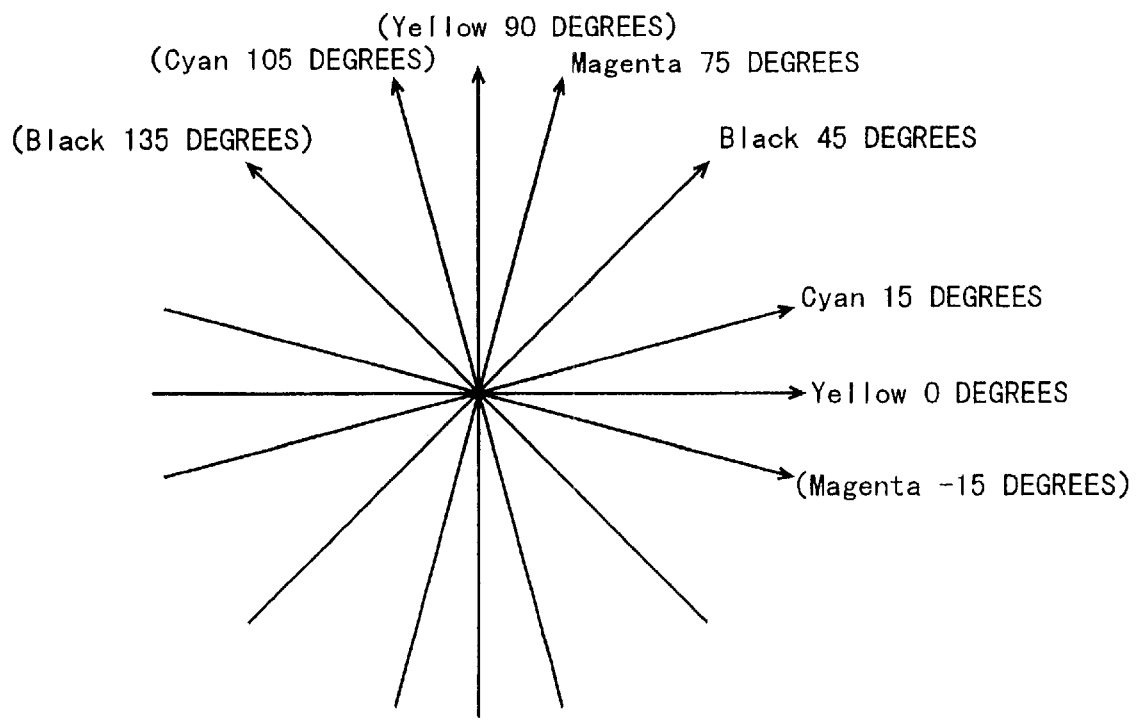

FIG. 1 is a flowchart illustrating a method of rotating the dither pattern of the present invention. FIG. 8 is an explanatory diagram showing operational processing procedures from Step S11 to Step S14 shown in FIG. 1. FIG. 9 is an explanatory diagram showing operational processing procedures of Step 15 using affine transformation shown in FIG. 1. With reference to these drawings, a method of rotating a dither pattern is hereinafter described.

In the step S11 of the flowchart in FIG. 1, as a first step, real-number coordinates (X0, Y0) obtained after being rotated are calculated from the coordinates (SIZE, 0) of the point 7 at the upper right end shown in FIG. 7 (*a*). These coordinates can be obtained by such a computation as that by the formula (1) in FIG. 8. The SIZE in the formula represents a length of a upper edge of the dither pattern. This formula is a rotation matrix shown in FIG. 3 (*a*). Further, in the step S12, the real-number coordinates (X0, Y0) obtained are converted to integer coordinates (X, Y) by counting fractions as one. By this computing, the coordinates on the point 7 shown in FIG. 7 (*b*) can be obtained.

If a dither pattern is assumed to be a matrix having 4×4 threshold values, the SIZE is 4.

Figure 3A:
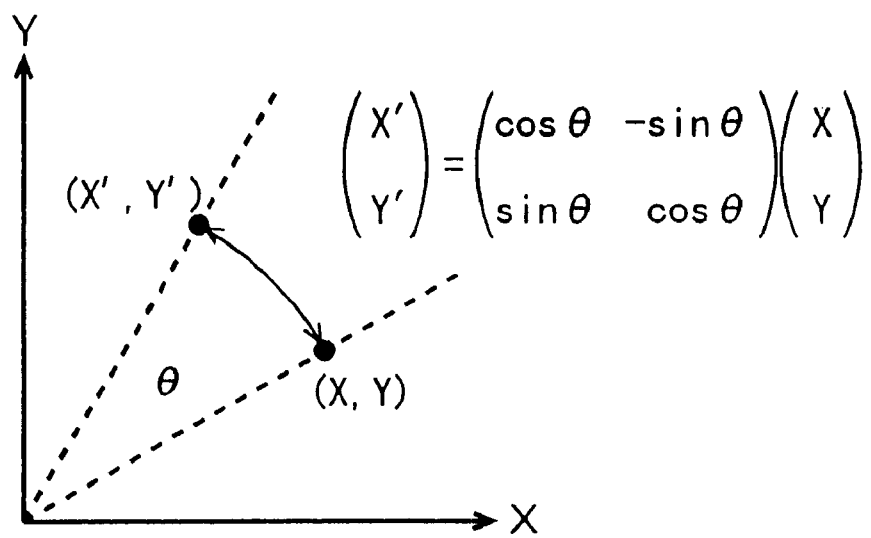
FIG. 3 is an explanatory diagram showing a method for rotating a general dither, FIG. 3 (a) being an example of a rotation matrix and FIG. 3 (b) showing a result obtained by rotating a dither pattern inputted.
Figure 3B:
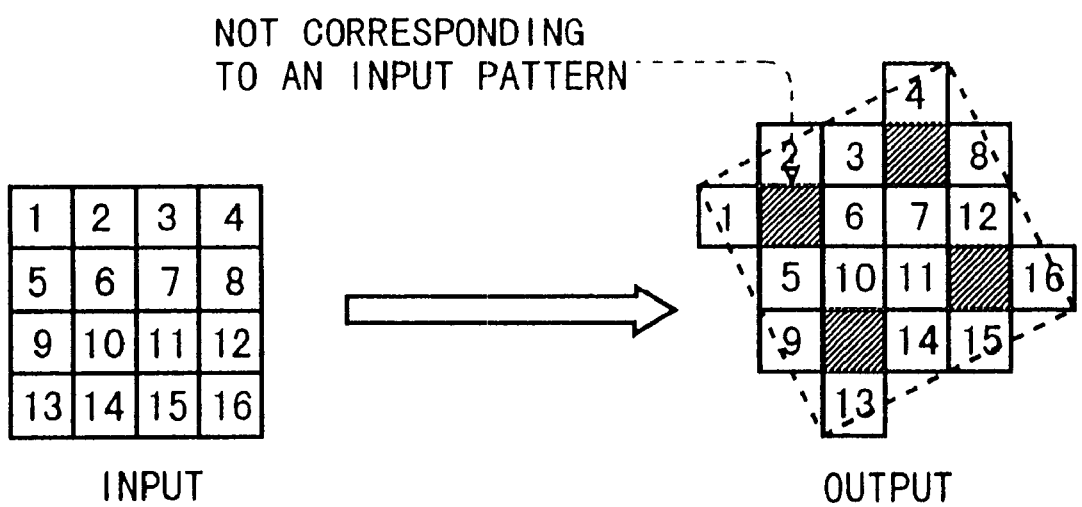

For example, by substituting the screen angle θ (e.g., 14 degrees) into the formula (1) in FIG. 8, real-number coordinates as shown in FIG. 8 (2) can be calculated. Further, by counting fractions of the above coordinates as one, the integer coordinates (X, Y) being (4, 1) are obtained as shown in FIG. 3 (3). At this point, fractions in the decimal place may be counted as one, or fractions over ½ may be counted as one with the rest disregarded or the fractions are omitted. If fractions are counted as one in this step, the same procedure of counting fractions as one is carried out in the conversion from real-number coordinates to integer coordinates described later as well. If fractions are omitted in this step, the same procedure of omitting fractions is carried out in the conversion from real-number coordinates to integer coordinates described later as well. Moreover, the counting of fractions as one causes the size of the dither pattern obtained after the rotation to be expanded, while the counting of fractions over ½ as one and disregarding the rest causes the size of the dither pattern obtained after the rotation to be reduced.

In the step S13, a rotation angle θ is corrected. A new rotation angle θ' is obtained by procedures described in FIG. 7. The formula (4) in FIG. 8 represents an operational formula for the above calculation. The symbol "atan" represents an angle formed when tangent is X/Y. The formula (3) in FIG. 8 is substituted into the formula (4) in FIG. 8 to obtain the formula (5) in FIG. 8 from which the new rotation angle θ' is calculated. In the step S 14, the ratio of a length of an edge from the origin 5 to the point 7 shown in FIG. 7 (*b*) to that of the original dither pattern is calculated, which is referred to as a magnification MUL. The formula (6) in FIG. 8 is an arithmetic expression for the magnification. By substituting results obtained from the formula (3) in FIG. 8 and the formula (4) in FIG. 8 into the formula (6) in FIG. 8, the magnification MUL can be calculated. The magnification MUL is data required for affine transformation processing described later.

Then, in the step S15 in FIG. 1, parameters required for the affine transformation processing are calculated. The affine transformation processing is operational processing by which, presuming that coordinates after being converted are (X', Y'), coordinates (X, Y) existing before being converted are obtained. Coefficients (A, B, C and D) of (X', Y') in the formula (8) in FIG. 9 are rotation matrixes wherein (E, F) are parallel moving components. In the example, as shown in the formula (10) in FIG. 9, the parallel moving components (E, F) are (0, 0). Each component of the rotation matrix, as shown in the formula (9) in FIG. 9, can be obtained by an arithmetic expression containing the magnification MUL of an edge of each dither pattern and the corrected screen angle θ' as factors. By substituting the magnification MUL and the screen angle θ' into the formula (9) in FIG. 9, the concrete parameter required for affine transformation can be obtained. The result is represented as the formula (11) in FIG. 9.

Figure 4A:
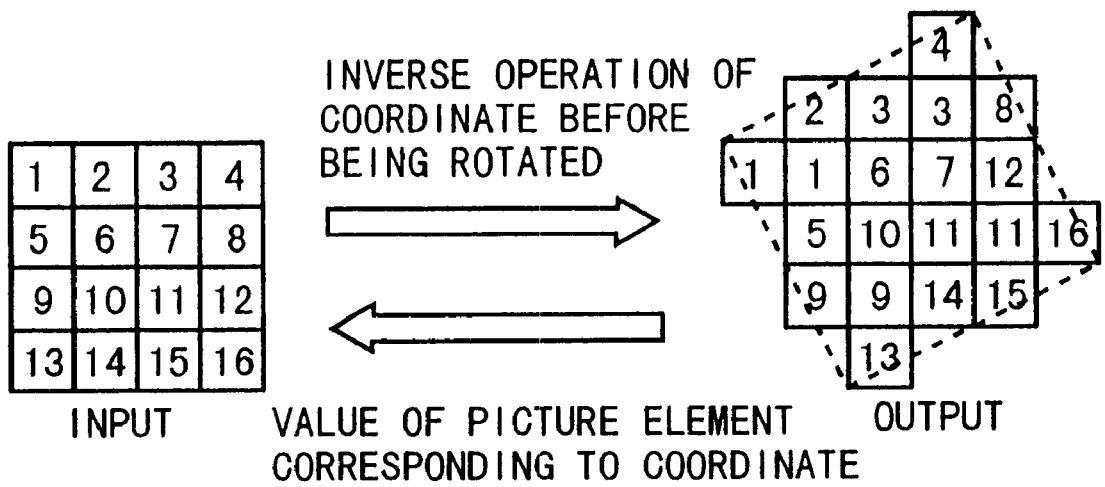
FIG. 4 is an explanatory diagram illustrating re-sampling processing of a device, FIG. 4 (a) showing the re-sampling processing and FIG. 4 (b) showing a coordinate system of the dither pattern.
Figure 4B:
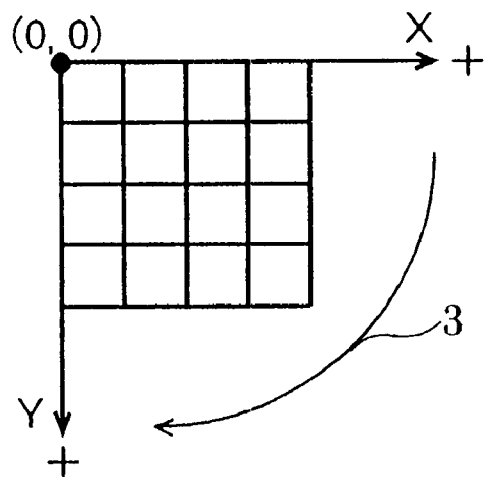
Figures 10A, 10B:
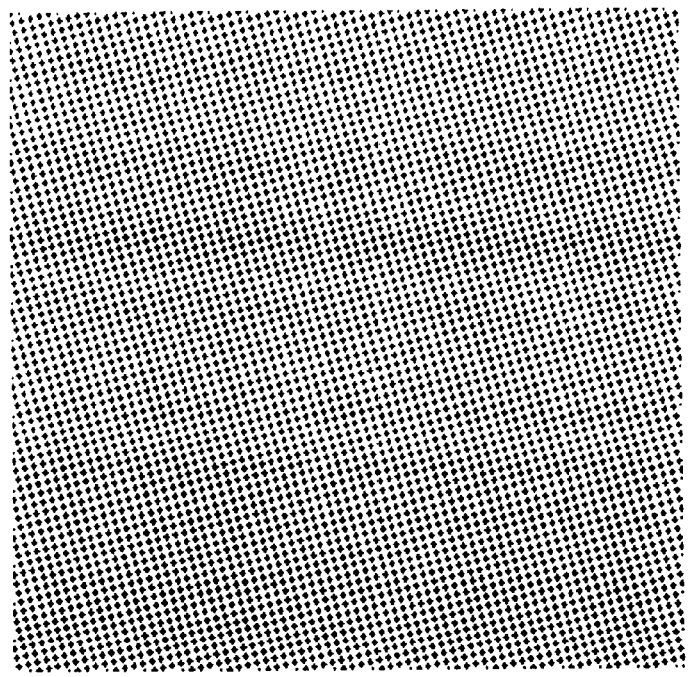
FIG. 10 is an explanatory diagram illustrating an effect of the present invention, FIG. 10 (a) showing a result obtained by rotating an inputted dot image described in a first embodiment, FIG. 10 (b) showing an example of the result obtained by rotating a dither pattern according to a method described in the first embodiment.

By performing a computation with the formula (8) in FIG. 9, using the parameters for the affine transformation, according to procedures in FIG. 4, all threshold values of the dither pattern obtained after the rotation can be set by selecting from any threshold value contained in the original dither pattern. That is, if an operational result is obtained that the threshold value assigned to coordinates (X', Y') of the dither pattern obtained after the rotation can correspond to a threshold value assigned to coordinates (X, Y) of the dither pattern obtained before the rotation, the corresponding threshold value becomes a factor for the dither pattern to be obtained after the rotation Furthermore, an example of actually rotating the dither pattern according to the present invention is described. FIG. 10 is an explanatory diagram illustrating an effect of the present invention, FIG. 10 (*a*) showing a result obtained by rotating an inputted dot image described in a first embodiment, FIG. 10 (*b*) showing an example of the result obtained by rotating a dither pattern according to a method described in the first embodiment.

As shown in FIG. 10 (*b*), all the shape and the array of threshold values of each dither pattern obtained after being rotated are the same. Accordingly, when the gradation image is converted to a dot image on the same conditions as in FIG. 5 using the above method, the image as shown in FIG. 10 (*a*) is obtained. The comparison of the image shown in FIG. 5 (*a*) with that shown in FIG. 10 (*a*) shows that the dot image obtained according to the present invention is binarized uniformly. Thus, according to the present invention, moire does not occur in the dot image.

Additionally, if a dither pattern is required to be rotated relative to the origin; which is set on the dither pattern to be based on, by any required screen angle, the origin can be set to a position having any threshold value in the dither pattern to be based on. The origin can be set on any of four corners of the dither pattern or any position having a threshold value within the dither pattern. Moreover, when the coordinates are corrected, by rounding fractions of the real-number coordinates indicating the origin of the adjacent dither pattern, so that the real-number coordinates are converted to integer coordinates, the way of rounding such fractions includes counting fractions as one or omission of fractions or counting fractions over ½ as one and disregarding the rest.

By selecting, as a screen angle, an angle which a segment connecting an origin of the dither pattern to be based on and that of the adjacent dither pattern obtained after the correction forms with a horizontal line, the origin of other dither patterns becomes integer coordinates as well.

Thus, by rotating a dither pattern to be based on by a required screen angle, obtaining real-number coordinates of an origin of an adjacent dither pattern, correcting coordinates by rounding fractions of the real-number coordinates so that the real-number coordinates are converted to integer coordinates, selecting, as a screen angle, an angle which a segment connecting an origin of the dither pattern to be based on and that of the adjacent dither pattern obtained after the correction forms with a horizontal line, a shape of any part of the dither pattern obtained after being rotated becomes uniform, thereby improving the quality of the dot image. That is, unlike the conventional method using a dither pattern having varied shapes and sizes obtained by a real number calculation and after being rotated, according to the present invention, a dither pattern having a uniform shape and size is used, thus preventing the occurrence of moire.

Furthermore, because the number of a group of threshold values constituting the dither pattern and its array are uniform at any part of an image, the moire is prevented that may occur, for example, when an image with uniform and intermediate density is converted to a dot image.

Second Embodiment

Figure 11:
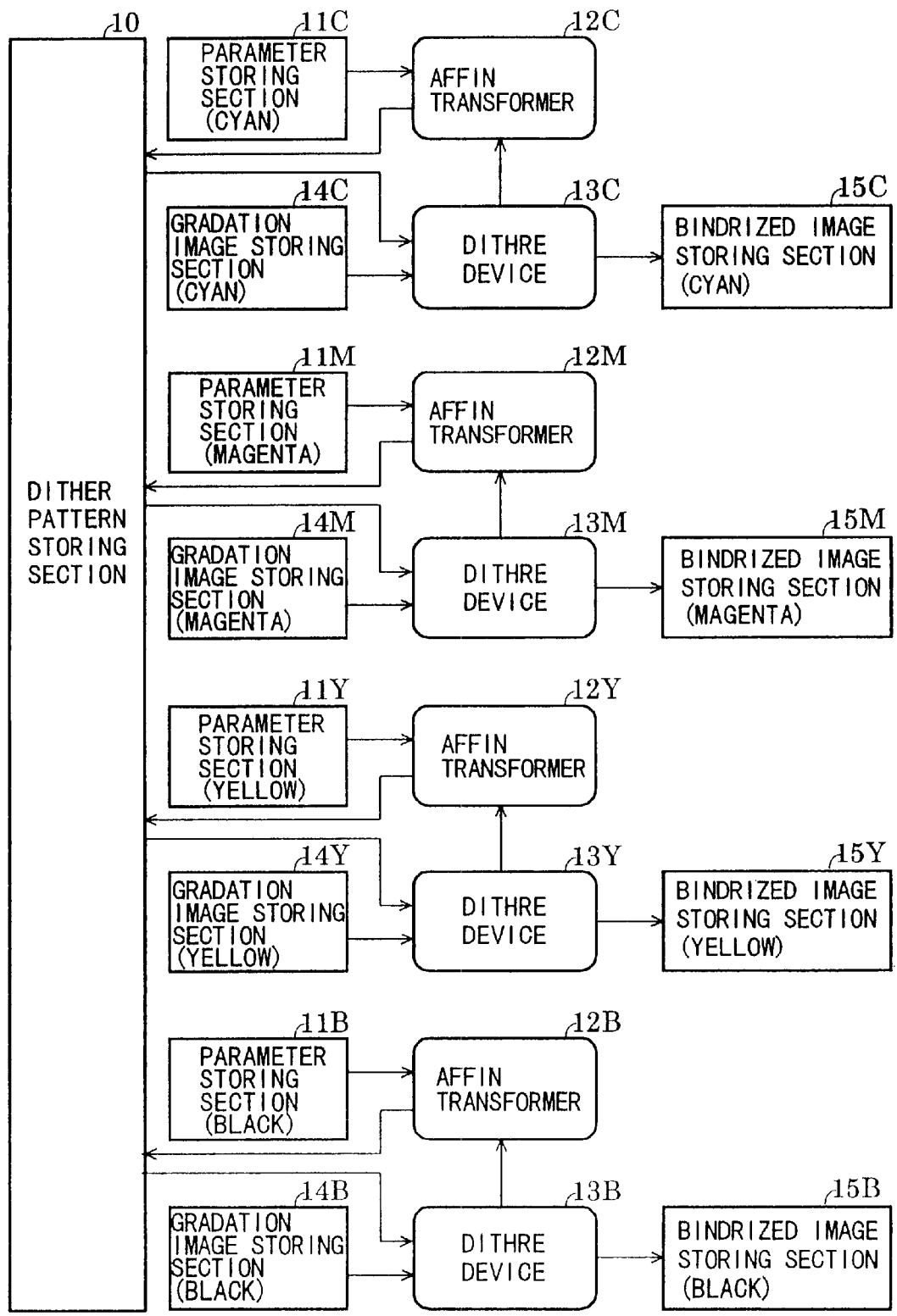
FIG. 11 is a block diagram of a dither pattern rotating device in second embodiment.

FIG. 11 is a block diagram of a dither pattern rotating device in the second embodiment. This device is adapted to implement an operation described in the first embodiment. The device is provided with a dither pattern storing section 10. The dither pattern stored in the dither pattern storing section 10 is original dither pattern data that has not been rotated. Each threshold value contained in the dither pattern and coordinates, seen from an origin, of a site having a threshold value in a dither pattern are stored therein. A parameter storing section 11c stores parameters required for affine transformation for every color component as described in FIG. 9 of the first embodiment. An affine transformer 12 is adapted to perform affine transformation on coordinates of each threshold obtained after being rotated using parameters stored in the parameter storing section 11C. Coordinates of each value of a picture element in an output image are fed from a dither device 13C. The dither device is one adapted to compare a value of a picture element of a gradation image for each color component stored in a gradation image storing section 14C with a threshold value of a dither pattern abstracted by procedures described later and to output a binarized image. The binarized image outputted by the dither device 13C is stored in a binarized image storing section 15C. Moreover, configurations of the affine transformer 12c and the dither device 13C are the same as for other affine transformers 12M, 12Y and 12B, and for other dither devices 13C, 13M and 13B. The parameter storing section 11C, gradation image storing section 14C and binarized image storing section 15C are all constructed on a memory device of a computer. Configurations of other parameter storing sections 11M, 11Y and 11B, gradation image storing sections 14M, 14Y, 14B, and binarized image storing sections 15M, 15Y and 15B are all the same except data to be stored.

Thus, the dither pattern rotating device is implemented by a computer program combined with a module having functions or objects described above.

Figures 12A, 12B:
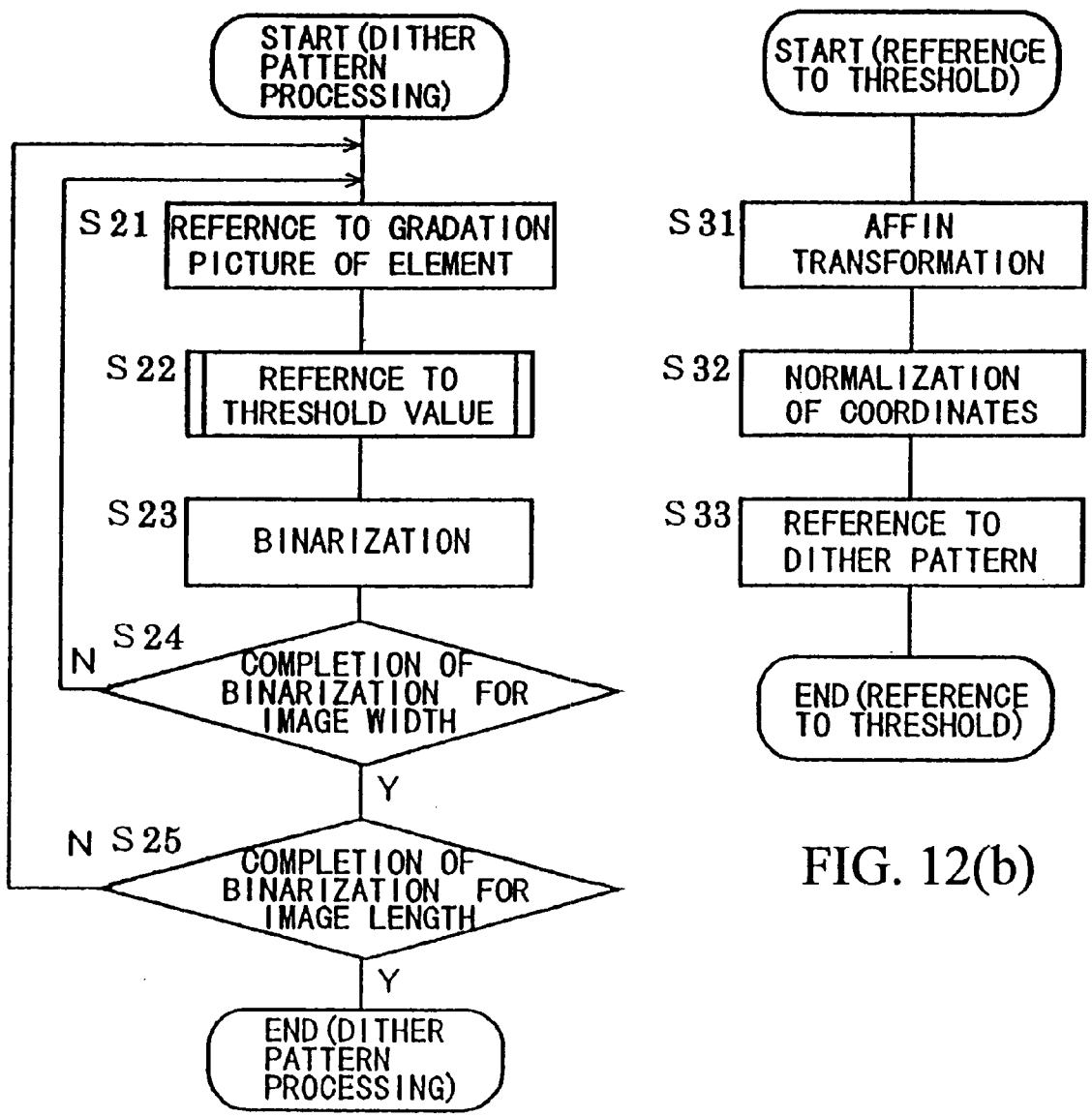
FIG. 12 is a flowchart of an operation of the dither pattern rotating device shown in FIG. 11, FIG. 12 (a) showing a main routine and FIG. 12 (b) showing a subroutine for reference to its threshold value.

FIG. 12 is a flowchart of an operation of the dither pattern rotating device shown in FIG. 11, FIG. 12 (a) showing a main routine and FIG. 12 (b) showing a subroutine for reference to its threshold value. FIG. 13 is an explanatory diagram showing an operational processing procedures for the dither pattern rotating device shown in FIG. 11.

To process a color image, a dither pattern rotation processing is performed for, for example, 3 to 4 color gradation images. Since the computation for processing of each color component is the same except for the screen angle, a description is given to only processing for the color component of cyan below.

In the step S21 shown in FIG. 12, the dither device 13C refers to one of values of picture elements in a gradation image stored in the gradation image storing section 14C. Then, in the step S22, a threshold value is referenced to binarize the value of the picture element. At this point, a threshold reference processing is carried out as shown in FIG. 12 (b). In the step S31, the affine transformer 12C takes out corresponding coordinates of a value of a picture element from the parameter storing section 11C and a parameter required for affine transformation from the parameter storing section 11 to carry out affine transformation processing. The formula (1) in FIG. 13 represents a parameter for affine transformation obtained by the formula (11) in FIG. 9. No parallel moving components exist unlike in the case of the formula (2) in FIG. 13. If values of coordinates on which the affine transformation is made are that X=10 and Y=12, a computation as shown in the formula (3) in FIG. 13 is made.

Then, in the step S32, the coordinate values are normalized. That is, real-number coordinates obtained by a computation are changed to integer coordinates by counting fractions as one. The formula (4) in FIG. 13 represents this processing. As a result, new coordinates are that X'=7 and Y'=14. At this point, in the step S33 in FIG. 12, a dither pattern is referenced. The dither pattern to be referenced is a 4×4 matrix. By performing a divisional calculation of coordinates shown in the formula (4) in FIG. 13, a coordinate seen from an origin of a site having each threshold value in the dither pattern are obtained.

The formula (5) in FIG. 13 represents contents of the computation. In the case of the coordinate X' to be obtained being 7, a computation wherein the number 7 is divided by 4, producing the remainder of 3 is carried out. The remainder being 3 is a coordinate seen from an origin of a site having a corresponding threshold value in the dither pattern. In such a way, coordinates, for example, (3, 2) in the dither pattern are obtained and a threshold value at the site is referenced. The referenced threshold value is a threshold value of the dither pattern obtained after being rotated. After that, the operation is returned back again to its main routine and, in the step S23, a binarizing processing of a gradation image using the above threshold value is made by the dither device 13C. This processing is repeated until the binarization of all the image width of an input image has been completed (step S24) and, further, until the binarization of all the image length of an input has been completed (step S25). The processing for cyan is the same as for magenta, black and yellow. FIG. 14 shows a dither pattern obtained before being rotated and after being rotated, FIG. 14 (a) showing a basic dither pattern obtained before being rotated and FIG. 14 (b) is a diagram showing dither patterns obtained after being rotated which are arranged vertically and horizontally. The same threshold value is assigned to a site having the same number in the dither patterns obtained before and after being rotated.

Referring to FIG. 14 (b), coordinates of a part where a hatching is assigned are (10, 12). By converting the coordinates using the formula (3) and (4) in FIG. 13 and executing the computation using the formula (5) in FIG. 13, the coordinates (3, 2) can be obtained. In FIG. 14 (a), the threshold value for the coordinates (3, 2) in the dither pattern is 12. This threshold value is used to binarize the picture element at coordinates (10, 12) of a gradation image. According to the present invention, the advantage of this device is that, unlike the conventional method wherein the binarization processing is to be carried out after the dither pattern is actually rotated, a parameter required for affine transformation obtained by the method disclosed in the first embodiment of the present invention is in advance stored in the affine transformer 12C and, by using this, a threshold value of a picture element to be used for binarizaiton is taken out for the dither pattern processing.

The dither pattern rotating device of the present invention allows the binarization, if a basic pattern is stored in memory, at a free screen angle to correspond to each color component to represent a color image. In addition, because the dither pattern can be used commonly to each color component, available memory is saved. In the above embodiments, the method for binarization of a gradation image by using the Dither method is described, however, the binarization method of the present invention can be applied to the method using the Dot pattern method. That is, the processing of the present invention described above is applied to both Dither and Dot pattern methods using a threshold pattern wherein a threshold is assigned in a pitch of array of dots described above. Accordingly, not only the dither pattern but also a variety of patterns are applicable as the threshold pattern of the present invention.

It is thus apparent that the present invention is not limited to the above embodiments but may be changed and modified without departing from the scope and spirit of the invention.

What is claimed is:

1. A method for converting a gradation image, having picture elements with values which are represented by multivalues, to a dot image having a selected screen angle, and for generating a threshold pattern wherein threshold values are assigned at a pitch of an array of dots in said dot image to binarize said picture elements, comprising steps of:

setting an origin of said threshold pattern and obtaining real-number coordinates of an origin of an adjacent threshold pattern by rotating said threshold pattern relative to said set origin by a predetermined screen angle;

correcting the coordinates of said origin of said adjacent threshold pattern so that said real-number coordinates are changed to integer coordinates by rounding fractions of said real-number coordinates; and selecting, as said selected screen angle, an angle which a segment connecting said set origin and the origin of said adjacent threshold pattern obtained after the correction forms with a horizontal line.

2. The method for generating a threshold pattern according to claim 1, further comprising the step of obtaining additional threshold patterns so that threshold patterns cover all of the dots of the dot image, wherein all of the threshold patterns have the same shape and wherein all values of each threshold pattern assigned at corresponding sites in each threshold pattern are the same.

3. The method for generating a threshold pattern according to claim 1 wherein coordinates (X, Y) of said threshold pattern existing before being rotated are related by an operational processing to coordinates (X', Y') of each threshold value of said threshold pattern obtained after being rotated, a threshold value assigned at coordinates (X,Y) of said threshold pattern existing before being rotated is selected, and the selected threshold value is used as a threshold value of said threshold pattern obtained after being rotated.

4. The method for generating a threshold pattern according to claim 3 wherein, in said operational processing, an affine transformation is performed using a magnification of a threshold pattern edge and a corrected screen angle as factors.

5. A gradation image binarizing device comprising:

a threshold pattern storing section used to store a threshold pattern for binarization;

a gradation image storing section used to store a gradation image to be binarized by said threshold pattern;

a parameter storing section used to store a rotation parameter obtained from a screen angle after correction which is carried out in a manner such that an origin is set for said pattern and real-number coordinates of an origin of an adjacent threshold pattern are obtained by rotating said threshold pattern relative to said set origin by a predetermined screen angle and such that coordinates of said origin of said adjacent threshold pattern are corrected so that said real-number coordinates are changed to integer coordinates by rounding fractions of said real-number coordinates and an angle which a segment connecting said set origin and the origin of the adjacent dither pattern obtained after said correction forms with a horizontal line is selected as a screen angle; and a means, responsive to said threshold pattern and a rotation parameter stored in said parameter storing section, for binarizing said gradation image.

* * * * *